(12) United States Patent
Suwa et al.

(10) Patent No.: US 11,525,503 B2
(45) Date of Patent: Dec. 13, 2022

(54) REDUCTION GEAR AND GEARED MOTOR

(71) Applicant: MABUCHI MOTOR CO., LTD., Matsudo (JP)

(72) Inventors: Masakazu Suwa, Matsudo (JP); Takao Mitsumizo, Matsudo (JP)

(73) Assignee: MABUCHI MOTOR CO., LTD., Matsudo (JP)

( * ) Notice: Subject to any disclaimer, the term of this patent is extended or adjusted under 35 U.S.C. 154(b) by 64 days.

(21) Appl. No.: 17/153,503

(22) Filed: Jan. 20, 2021

(65) Prior Publication Data
US 2021/0239203 A1 Aug. 5, 2021

(30) Foreign Application Priority Data
Jan. 31, 2020 (JP) .............................. JP2020-014718

(51) Int. Cl.
*F16H 57/03* (2012.01)
*F16H 1/46* (2006.01)
*F16H 57/032* (2012.01)
*F16H 57/031* (2012.01)
*F16H 57/02* (2012.01)

(52) U.S. Cl.
CPC ............... *F16H 57/03* (2013.01); *F16H 1/46* (2013.01); *F16H 57/031* (2013.01); *F16H 57/032* (2013.01); *F16H 2057/02034* (2013.01); *F16H 2057/02082* (2013.01)

(58) Field of Classification Search
CPC ...... F16H 57/03; F16H 57/031; F16H 57/032; F16H 1/46; F16H 2057/02034; F16H 2057/02082
See application file for complete search history.

(56) References Cited

U.S. PATENT DOCUMENTS

| 2,520,282 A | * | 8/1950 | Henry | ................ F16H 1/32 475/179 |
|---|---|---|---|---|
| 2019/0085631 A1 | | 3/2019 | Reinecker | |
| 2019/0285169 A1 | | 9/2019 | Ahrens et al. | |

FOREIGN PATENT DOCUMENTS

| DE | 10 2017 216 646 A1 | 3/2019 |
| DE | 10 2018 204 051 A1 | 9/2019 |
| JP | H7-1056 B | 1/1995 |
| JP | 2011131372 A * | 7/2011 |

OTHER PUBLICATIONS

Office Action issued by the German Patent and Trademark Office for corresponding DE Patent Application No. 10 2021 101 967.2, dated Sep. 30, 2022, with an English translation.

* cited by examiner

*Primary Examiner* — Colby M Hansen
(74) *Attorney, Agent, or Firm* — Myers Wolin, LLC

(57) ABSTRACT

A reduction gear configured to decelerate and output rotation of a motor by two-stage planetary gear mechanisms disposed side by side in an axial direction includes: a case made of resin, the case being formed into a cylindrical shape in which the two-stage planetary gear mechanisms are incorporated, and having at least one of a lid portion and a bottom portion provided at each of both axial ends; and a reinforcing component that is formed of a material having a Young's modulus higher than a Young's modulus of a material of the case. The reinforcing component extends along at least a part of an inner peripheral surface in an axial central portion of the case.

16 Claims, 3 Drawing Sheets

REDUCTION GEAR AND GEARED MOTOR

CROSS-REFERENCE TO THE RELATED APPLICATION

This application claims priority under 35 U.S.C. 119 from Japanese Patent Application No. 2020-014718, filed on Jan. 31, 2020, the contents of which are incorporated by reference herein.

BACKGROUND

Technical Field

The present disclosure relates to a reduction gear using two-stage planetary gear mechanisms and a geared motor including the reduction gear.

Related Art

Conventionally, as a power source for an electric gate (e.g., a power lift gate) of a vehicle, a motor with a reduction gear (geared motor) that decelerates and transmits rotation of the motor has been put into practical use. One of these geared motors is mounted inside a cylinder of a damper that supports a gate, and includes a reduction gear using a planetary gear mechanism in which a motor shaft and an output shaft are coaxial. Further, since the geared motor is used to electrically open and close the gate, relatively large torque is required. Therefore, it is conceivable to realize a high reduction ratio by attaching, to a motor, a reduction gear made of multistage planetary gear mechanisms of, for example, Japanese Examined Patent Application Publication No. HEI 7-1056 or the like.

SUMMARY

By the way, since the electric gate may be opened and closed when an engine of a vehicle is stopped, operation sound is conspicuous, so that there is a demand that mechanical noise is suppressed to a low level. However, in order to reduce the mechanical noise, for example, when a case of the reduction gear is made of metal, another problem of an increase in weight of the reduction gear is caused. Further, although it is conceivable to reduce the mechanical noise by increasing a wall thickness of the case made of resin, there are problems that if the wall thickness is increased without changing an outer diameter of the case, a space required inside the case cannot be secured, and on the other hand, that if the wall thickness is increased while the space required inside the case is secured, the reduction gear becomes large.

The reduction gear of the present disclosure has been devised in light of such problems, and one object of the present disclosure is to reduce mechanical noise while securing a space inside a resin case and avoiding an increase in size. In addition, one object of a geared motor of the present disclosure is to improve quietness without increasing a size by including the reduction gear of the present disclosure. Note that the present disclosure is not limited to these objects, but another object thereof is to exert actions and effects that are derived by each configuration described in DETAILED DESCRIPTION described later and that cannot be obtained by the conventional technique.

(1) A reduction gear disclosed herein is a reduction gear configured to decelerate and output rotation of a motor by two-stage planetary gear mechanisms disposed side by side in an axial direction, the reduction gear including: a case made of resin, the case being formed into a cylindrical shape in which the two-stage planetary gear mechanisms are incorporated, and having at least one of a lid portion and a bottom portion provided at each of both axial ends; and a reinforcing component that is formed of a material having a Young's modulus higher than that of a material of the case and extends along at least a part of an inner peripheral surface in an axial central portion of the case.

(2) It is preferable that the reinforcing component has a ring shape extending over an entire circumference of the case in the axial central portion of the case.

(3) It is preferable that the reinforcing component is located between pinion gears of the two-stage planetary gear mechanisms.

(4) It is preferable that the inner peripheral surface of the case includes a small-diameter inner peripheral surface and a large-diameter inner peripheral surface having different inner diameters from each other in the axial direction, and a tapered surface connecting the small-diameter inner peripheral surface and the large-diameter inner peripheral surface and inclined in the axial direction. In this case, it is preferable that the reinforcing component is press-fitted into the case and disposed at a position in contact with a boundary line between the large-diameter inner peripheral surface and the tapered surface.

(5) It is preferable that the case has a bottomed cylindrical shape having the bottom portion at one axial end and the lid portion at another axial end, and is attached to the motor in a direction in which the bottom portion is located on a motor side.

(6) It is preferable that the lid portion is press-fitted into an opening at the other axial end of the case.

(7) A geared motor disclosed herein includes the reduction gear according to any one of (1) to (6) above, and the motor having a shaft integrally rotating with a sun gear of the planetary gear mechanism in a first stage of the reduction gear.

According to the disclosed reduction gear, mechanical noise can be reduced while securing a space inside the resin case, and avoiding an increase in size.

Further, according to the geared motor including the disclosed reduction gear, quietness can be improved without increasing a size.

DETAILED DESCRIPTION

A reduction gear and a geared motor as an embodiment will be described with reference to the drawings. The following embodiment is illustrative only and is not intended to preclude application of various modifications and techniques that are not expressly described in the following embodiments. Each of the configurations of the present embodiment can be variously modified without departing from the gist thereof. In addition, selection can be made as necessary, or combinations can be made as appropriate.

1. Overall Configuration

Figure 1:
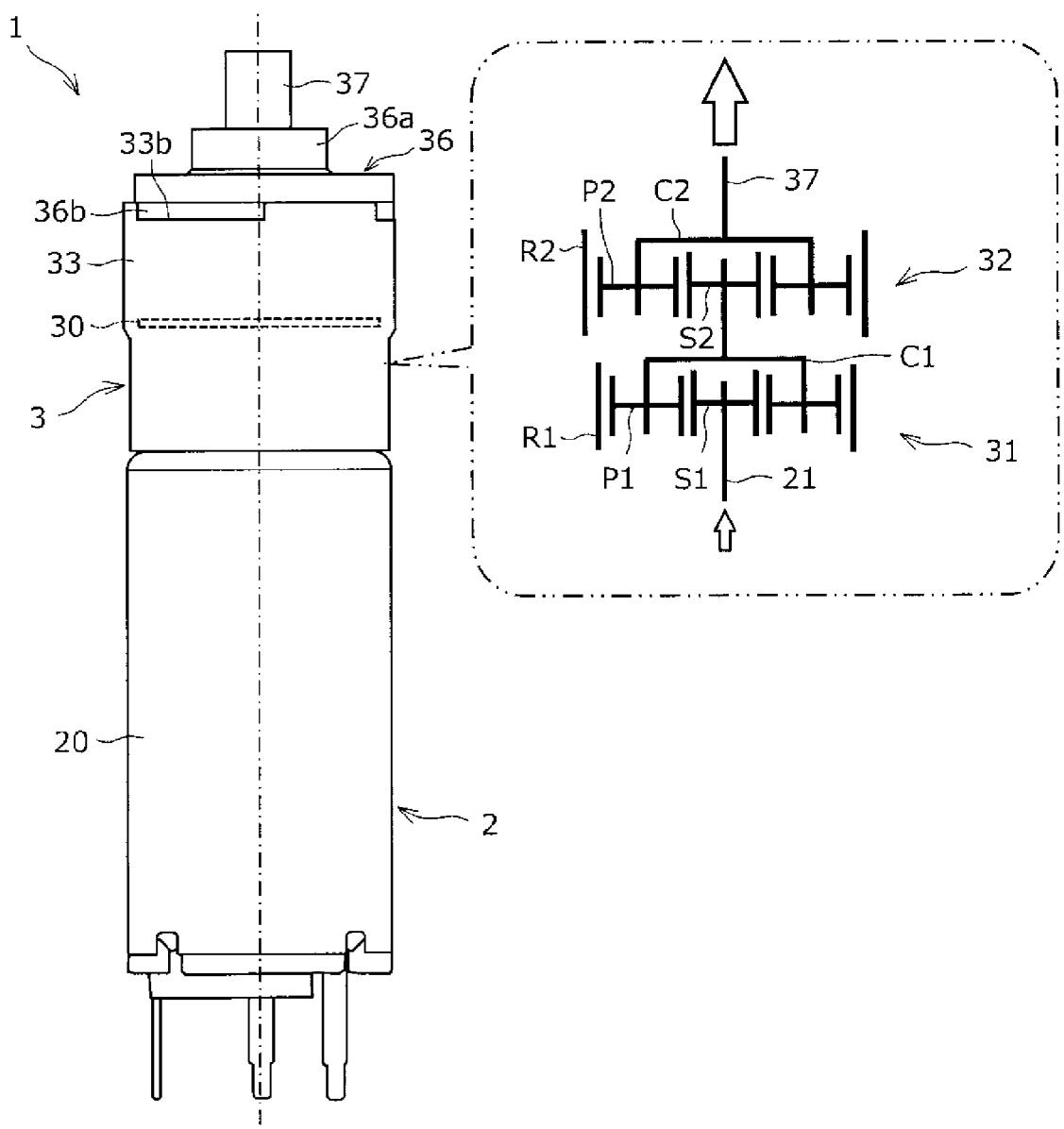
FIG. 1 is a side view showing a geared motor including a reduction gear according to an embodiment, and a skeleton view of planetary gear mechanisms included in this reduction gear.
Figure 2:
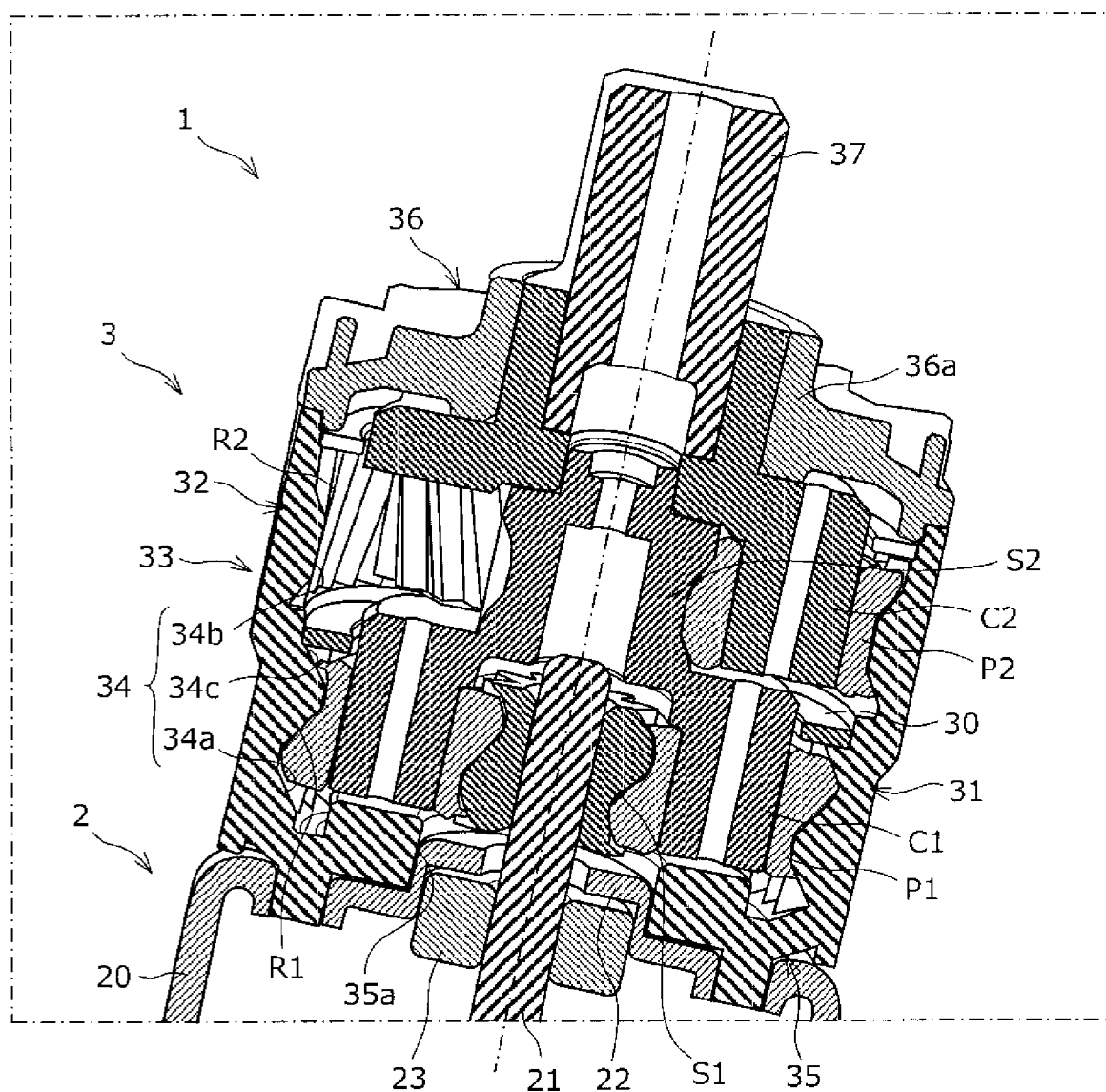
FIG. 2 is a perspective cross-sectional view when the reduction gear of the geared motor in FIG. 1, and a part of a motor are cut in an axial direction, and are viewed obliquely.

As shown in FIG. 1, a geared motor 1 according to the present embodiment includes a motor 2 and a reduction gear 3, and is used, for example, as a power source of an electric gate (power lift gate) of a vehicle. The motor 2 is, for example, a permanent magnet field type DC motor with a brush, and a stator and a rotor (not shown) are incorporated in a bottomed cylindrical housing 20. As shown in FIG. 2, the housing 20 has a projected portion 22 formed to expand in an axial direction on an end surface thereof, and a bearing 23 fixed to an inside of the projected portion 22. A rotation shaft 21 of the motor 2 is protrusively provided from one axial end of the housing 20 to an outside in a state of being rotatably supported by the bearing 23, and rotates integrally with a sun gear S1 described later.

As shown in FIG. 1, a reduction gear 3 decelerates and outputs the rotation of the motor 2 by two-stage planetary gear mechanisms 31, 32 disposed side by side in the axial direction. That is, the reduction gear 3 of the present embodiment is a planetary gear type two-stage reduction gear for a power lift gate. The two planetary gear mechanisms 31, 32 are incorporated in a case 33 made of resin and formed into a cylindrical shape. At least one of a lid portion and a bottom portion is provided at each of both axial ends of the case 33.

Figure 3:
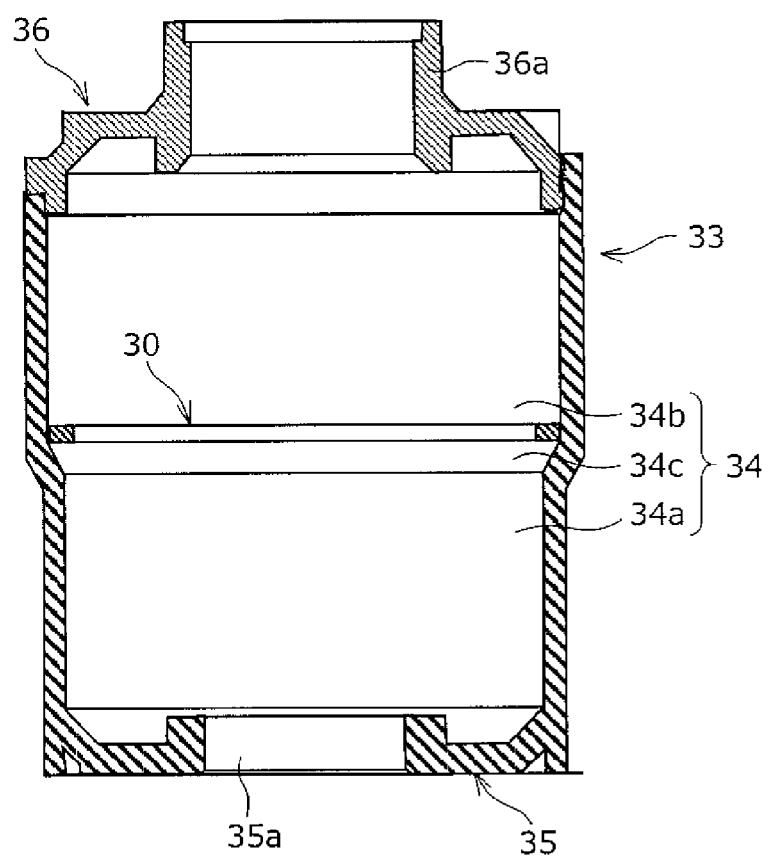
FIG. 3 is an axial cross-sectional view showing a case of the reduction gear in FIG. 1.

As shown in FIGS. 2 and 3, the case 33 of the present embodiment has a tapered bottomed cylindrical shape. That is, at the one axial end of the case 33, a bottom portion 35 is provided, in an opening at another axial end, a lid portion 36 is provided, and in an axial intermediate portion, a tapered inclined portion having a variable outer diameter is provided. The case 33 is attached to the motor 2 such that the bottom portion 35 is located on a motor 2 side and the lid portion 36 is located on an opposite side (output side) of the motor 2. In the present embodiment, a hole portion 35a into which the projected portion 22 of the motor 2 is fitted is provided in a center portion of the bottom portion 35. A cylindrical portion 36a through which a carrier C2 described later is inserted is provided at a center portion of the lid portion 36.

The lid portion 36 of the present embodiment is press-fitted into the opening at the other axial end of the case 33. Note that in the reduction gear 3 of the present embodiment, as shown in FIG. 1, a fan-shaped recessed portion 33b is formed at an edge portion of the case 33 on another axial end side, and at an outer peripheral end portion of the lid portion 36, a rotation preventing portion 36b is provided, the rotation preventing portion 36b being fitted into the recessed portion 33b to thereby disable the lid portion 36 to rotate with respect to the case 33.

Next, the two planetary gear mechanisms 31, 32 will be described. In the reduction gear 3 of the present embodiment, as shown in FIG. 2, each of the planetary gear mechanisms 31, 32 is configured of a helical gear. Hereinafter, when the first-stage (high speed side) planetary gear mechanism 31 and the second-stage (low speed side) planetary gear mechanism 32 are distinguished from each other, the former is referred to as a "first planetary gear mechanism 31" and the latter as a "second planetary gear mechanism 32". The second planetary gear mechanism 32 is formed to have a larger diameter than that of the first planetary gear mechanism 31, so that load resistance is enhanced.

As shown in FIGS. 1 and 2, in the first planetary gear mechanism 31, the sun gear S1 is fixed to the rotation shaft 21 of the motor 2, a ring gear R1 is fixed to the case 33, and a carrier C1 joining a pinion gear P1 engaging with both the sun gear S1 and the ring gear R1 is an output element. In the second planetary gear mechanism 32, a sun gear S2 is provided so as to be joined to the carrier C1 of the first planetary gear mechanism 31 and integrally rotate, a ring gear R2 is fixed to the case 33, and the carrier C2 joining a pinion gear P2 engaging with both the sun gear S2 and the ring gear R2 is fixed to an output shaft 37.

Thus, motor output (rotation) input to the sun gear S1 of the first planetary gear mechanism 31 is output from the output shaft 37 rotating integrally with the carrier C2 of the second planetary gear mechanism 32. Note that as shown in FIG. 2, the two ring gears R1, R2 are formed on an inner peripheral surface 34 of the case 33 and are provided integrally with the case 33. Moreover, carrier pins of the carriers C1, C2 are each cantilevered, so that an axial dimension of the case 33 can be reduced.

The inner peripheral surface 34 of the case 33 of the present embodiment includes a small-diameter inner peripheral surface 34a and a large-diameter inner peripheral surface 34b that have different inner diameters from each other in the axial direction, and a tapered surface 34c that connects them and is inclined in the axial direction. The small-diameter inner peripheral surface 34a is located on the motor 2 side, and the large-diameter inner peripheral surface 34b is located on the output side. Each of the small-diameter inner peripheral surface 34a and the large-diameter inner peripheral surface 34b is a cylindrical surface formed with a uniform inner diameter, and the inner diameter of the former is smaller than that of the latter. In the present embodiment, the small-diameter inner peripheral surface 34a is formed with the ring gear R1 of the first planetary gear mechanism 31, and the large-diameter inner peripheral surface 34b is formed with the ring gear R2 of the second planetary gear mechanism 32. Note that in the case 33 of FIG. 3, the ring gears R1, R2 formed on the inner peripheral surface 34 are omitted.

2. Configuration of Main Sections

Next, a configuration for reducing mechanical noise during operation of the motor 2 will be described. As a result of analysis of the mechanical noise of the reduction gear 3, it has been found that an axial central portion of the case 33 vibrates more in comparison with both end portions when the motor 2 is operated. This is because, as shown in FIG. 3, the bottom portion 35 and the lid portion 36 are provided at both the axial ends of the case 33, and have high strengths, while the axial central portion has a lower strength than those at both the end portions and is easily vibrated.

Based on such an analysis result, the reduction gear 3 is provided with a reinforcing component 30 formed of a material having a Young's modulus higher than that of a material of the case 33. As shown in FIGS. 1 and 2, this reinforcing component 30 extends along at least a part of the inner peripheral surface 34 in the axial central portion of the case 33. In this manner, by disposing the reinforcing component 30 having a high strength that supports the axial central portion of the case 33, a strength of the axial central portion is increased, vibration is suppressed, and mechanical noise is reduced.

The material of the reinforcing component 30 may be higher in strength than that of the case 33 (high Young's modulus), and may be, for example, a metal such as iron, aluminum or copper, or a resin having a higher strength. The reinforcing component 30 may have, for example, a ring shape (e.g., a washer) extending over an entire circumference of the case 33 in the axial central portion of the case 33, or a C shape with a part of a circumference missing. Further, the number of the reinforcing components 30 is not limited to one, and a plurality of reinforcing components 30 each having an arc shape may extend at the same axial position with a gap in a circumferential direction therebetween. In the present embodiment, the reinforcing component 30 having a ring shape is exemplified.

As shown in FIG. 2, the reinforcing component 30 of the present embodiment is located between the pinion gears P1, P2 of the two planetary gear mechanisms 31, 32. A relatively wide space in the radial direction is formed between these pinion gears P1, P2 in the internal space of the case 33. Since a strength of the case 33 can be increased as a radial dimension (a half of a difference obtained by subtracting an inner diameter from an outer diameter) of the ring-shaped reinforcing component 30 is larger, disposing the reinforcing component 30 between the pinion gears P1, P2 can further increase the strength of the case 33. Note that the reinforcing component 30 of the present embodiment is disposed outside the carrier C1 of the first planetary gear mechanism 31 in the radial direction with a slight gap therebetween.

Further, the reinforcing component 30 of the present embodiment is press-fitted from the opening on the other end side of the case 33, and as shown in FIG. 3, is disposed at a position in contact with a boundary line between the large-diameter inner peripheral surface 34b and the tapered surface 34c. That is, the reinforcing component 30 is press-fitted up to a position where the inner diameter of the inner peripheral surface 34 changes, and is fixed at this position. Note that the case 33 vibrates most easily at a position where a distance from a surface of the bottom portion 35 facing a case inside, and a distance from an end surface of the lid portion 36 facing the case inside are equal (an axial center position), so that it is preferable that the reinforcing component 30 is disposed at this position.

3. Effects (1) In the above-described reduction gear 3, the reinforcing component 30 formed of the material having a Young's modulus higher than that of the material of the case 33 extends along at least a part of the inner peripheral surface 34 in the axial central portion of the case 33. Thus, since the strength of the axial central portion, which most easily vibrates in the case 33, can be increased, the vibration of the case 33 can be suppressed.

Further, if the strength equivalent to the strength of the case 33, which is obtained when the reinforcing component 30 is provided, is obtained by devising a structure of the case made of resin without providing the reinforcing component 30, it is conceivable that a wall thickness of the case is increased or a rib is added. However, since the Young's modulus of the case is lower than that of the reinforcing component 30, in order to secure the strength only by the structure of the case, an increase in size of the case and complication of the shape cannot be avoided.

In response to such a problem, since the above-described reduction gear 3 can achieve high strength with the simple configuration in which the reinforcing component 30 is provided, it is not necessary to increase the wall thickness of the case 33, thereby increasing the size or complicating the shape. Therefore, according to the above-described reduction gear 3, it is possible to reduce mechanical noise while securing a space inside the case 33 and avoiding an increase in size.

(2) When the reinforcing component 30 has a ring shape extending over the entire circumference of the case 33, the axial central portion of the case 33 can be uniformly strengthened highly over the entire circumference, so that mechanical noise can be further reduced.

(3) Further, since the above-described reinforcing component 30 is disposed in the relatively wide space between the pinion gears P1, P2 of the two-stage planetary gear mechanisms 31, 32 inside the case 33, the radial dimension of the reinforcing component 30 can be made large. This can increase the strength of the axial central portion of the case 33, so that mechanical noise can be further reduced.

(4) The above-described case 33 has the small-diameter inner peripheral surface 34a, the large-diameter inner peripheral surface 34b, and the tapered surface 34c connecting these, and the reinforcing component 30 is press-fitted from the opening of the case 33 and disposed at the position in contact with the boundary line between the large-diameter inner peripheral surface 34b and the tapered surface 34c. Therefore, the use of the reduction gear 3 can prevent the position of the reinforcing component 30 from being deviated, and the reduction of mechanical noise can be continuously achieved. Note that forming the portion where the inner diameter of the case 33 differs as a tapered shape (inclined plane) can facilitate molding of the case 33.

(5) In the above-described reduction gear 3, the bottom portion 35 of the bottomed cylindrical case 33 is attached to the motor 2 in a direction in which the bottom portion 35 is located on the motor 2 side, and the lid portion 36 is disposed on the output side. Therefore, only by changing the shape of the lid portion 36, specifications of an element (connection object) to be connected to the output side of the reduction gear 3 can be met. In other words, the lid portion 36 having a relatively simple shape can be changed for each connection object, and the case 33 having a relatively complex shape can be used in common for various kinds of connection objects, so that a cost can be reduced.

Moreover, since the second planetary gear mechanism 32 (low speed side) has a larger diameter than the first planetary gear mechanism 31 (high speed side), the inner diameter of the low speed side needs to be larger than the inner diameter of the high speed side when a difference is provided in the inner diameter of the case 33. For this, in the above-described reduction gear 3, since the case 33 is attached to the motor 2 in the direction in which the bottom portion 35 is located on the motor 2 side, the inner diameter of the case 33 on the opening side can be made larger than the inner diameter on the bottom portion 35 side, and a mold can be drawn out at the time of resin molding. Therefore, the case 33 can be formed in a stepped shape, and the case 33 can be downsized.

Further, by attaching the case 33 to the motor 2 with the bottom portion 35 facing the motor 2 side, a fitting portion between the case 33 and the lid portion 36 can be separated from the motor 2 and the first planetary gear mechanism 31. Since the motor 2 and the first planetary gear mechanism 31 are vibration sources that vibrate the reduction gear 3, by separating the fitting portion from the vibration sources, mechanical noise at the fitting portion can be reduced even if a slight gap exists in the fitting between the case 33 and the lid portion 36.

(6) In the above-described reduction gear 3, since the lid portion 36 is press-fitted into the opening of the case 33, the vibration in the opening of the case 33 can be suppressed.

(7) According to the geared motor 1 including the above-described reduction gear 3, quietness can be improved without increasing the size.

4. Others

The above-described geared motor 1 and reduction gear 3 are examples, and the present disclosure is not limited to those described above. For example, the reinforcing component 30 may be insert-molded instead of being press-fitted into the case 33. That is, the reinforcing component 30 may be provided so as to be exposed inside the case, may be embedded in the case, or may be provided outside the case. Moreover, the position of the reinforcing component 30 is not limited to between the pinion gears P1, P2 of the planetary gear mechanisms 31, 32, and may be a position overlapping with either one of the planetary gear mechanisms 31, 32 (e.g., a position where it overlaps the ring gear R1 or R2). At least, by disposing the reinforcing component in the axial central portion of the case, the same effects as in the above-described embodiment can be obtained.

The shape of the case 33 is not limited to the tapered bottomed cylindrical shape described above. For example, instead of the taper, it may be a stepped cylindrical shape, or may be a cylindrical shape in which the outer diameter of the case is constant in the axial direction. In the case of the stepped cylindrical case, the position of the reinforcing component can be stabilized by disposing (e.g., press-fitting) the reinforcing component in a stepped portion. Note that the thickness (wall thickness) of the case may not be constant in the axial direction. That is, the inner peripheral surface may be provided with a taper or a step, and the outer peripheral surface may have a constant outer diameter. Further, openings may be provided at both the axial ends of the case, and lid portions may be attached to these openings. An attachment direction of the case to the motor 2 may be opposite to the foregoing.

The configurations of the two-stage planetary gear mechanisms 31, 32 are not limited to those described above. For example, the helical gear may be replaced with a spur gear, or the ring gears R1, R2 may not be integrally formed on the inner peripheral surface 34 of the case 33, but may be retrofitted to the case. The types of input elements (sun gears), output elements (carriers), and fixed elements (ring gears) are not limited to those described above.

Note that application of the geared motor 1 is not limited to a driving source of the electric gate of the vehicle, but may be applied to driving sources of various electric devices.

What is claimed is:

1. A reduction gear configured to decelerate and output rotation of a motor by two-stage planetary gear mechanisms disposed side by side in an axial direction, the reduction gear comprising:
    a case made of resin, the case being formed into a cylindrical shape in which the two-stage planetary gear mechanisms are incorporated, and having at least one of a lid portion and a bottom portion provided at each of both axial ends; and
    a reinforcing component that is formed of a material having a Young's modulus higher than a Young's modulus of a material of the case and extends along at least a part of an inner peripheral surface in an axial central portion of the case.

2. The reduction gear according to claim 1, wherein the reinforcing component has a ring shape extending over an entire circumference of the case in the axial central portion of the case.

3. The reduction gear according to claim 2, wherein the reinforcing component is located between pinion gears of the two-stage planetary gear mechanisms.

4. The reduction gear according to claim 2,
    wherein the inner peripheral surface of the case includes a small-diameter inner peripheral surface and a large-diameter inner peripheral surface having different inner diameters from each other in the axial direction, and a tapered surface connecting the small-diameter inner peripheral surface and the large-diameter inner peripheral surface and inclined in the axial direction, and
    the reinforcing component is press-fitted into the case and disposed at a position in contact with a boundary line between the large-diameter inner peripheral surface and the tapered surface.

5. The reduction gear according to claim 2, wherein the case has a bottomed cylindrical shape having the bottom portion at one axial end and the lid portion at another axial end, and is attached to the motor in a direction in which the bottom portion is located on a motor side.

6. The reduction gear according to claim 5, wherein the lid portion is press-fitted into an opening at the other axial end of the case.

7. The reduction gear according to claim 1, wherein the reinforcing component is located between pinion gears of the two-stage planetary gear mechanisms.

8. The reduction gear according to claim 7,
    wherein the inner peripheral surface of the case includes a small-diameter inner peripheral surface and a large-diameter inner peripheral surface having different inner diameters from each other in the axial direction, and a tapered surface connecting the small-diameter inner peripheral surface and the large-diameter inner peripheral surface and inclined in the axial direction, and
    the reinforcing component is press-fitted into the case and disposed at a position in contact with a boundary line between the large-diameter inner peripheral surface and the tapered surface.

9. The reduction gear according to claim 7, wherein the case has a bottomed cylindrical shape having the bottom portion at one axial end and the lid portion at another axial end, and is attached to the motor in a direction in which the bottom portion is located on a motor side.

10. The reduction gear according to claim 9, wherein the lid portion is press-fitted into an opening at the other axial end of the case.

11. The reduction gear according to claim 1,
    wherein the inner peripheral surface of the case includes a small-diameter inner peripheral surface and a large-diameter inner peripheral surface having different inner diameters from each other in the axial direction, and a tapered surface connecting the small-diameter inner peripheral surface and the large-diameter inner peripheral surface and inclined in the axial direction, and
    the reinforcing component is press-fitted into the case and disposed at a position in contact with a boundary line between the large-diameter inner peripheral surface and the tapered surface.

12. The reduction gear according to claim 11, wherein the case has a bottomed cylindrical shape having the bottom portion at one axial end and the lid portion at another axial end, and is attached to the motor in a direction in which the bottom portion is located on a motor side.

13. The reduction gear according to claim 12, wherein the lid portion is press-fitted into an opening at the other axial end of the case.

14. The reduction gear according to claim 1, wherein the case has a bottomed cylindrical shape having the bottom portion at one axial end and the lid portion at another axial end, and is attached to the motor in a direction in which the bottom portion is located on a motor side.

15. The reduction gear according to claim 14, wherein the lid portion is press-fitted into an opening at the other axial end of the case.

16. A geared motor comprising:
- a reduction gear configured to decelerate and output rotation of a motor by two-stage planetary gear mechanisms disposed side by side in an axial direction, the reduction gear comprising:
- a case made of resin, the case being formed into a cylindrical shape in which the two-stage planetary gear mechanisms are incorporated, and having at least one of a lid portion and a bottom portion provided at each of both axial ends; and
- a reinforcing component that is formed of a material having a Young's modulus higher than a Young's modulus of a material of the case and extends along at least a part of an inner peripheral surface in an axial central portion of the case; and
- the motor having a shaft integrally rotating with a sun gear of the planetary gear mechanism in a first stage of the reduction gear.

* * * * *